(12) United States Patent
Saitoh

(10) Patent No.: US 12,540,026 B2
(45) Date of Patent: Feb. 3, 2026

(54) DRIP BAG

(71) Applicant: OHKI CO., LTD., Osaka (JP)

(72) Inventor: Mitsunori Saitoh, Takatsuki (JP)

(73) Assignee: OHKI CO., LTD., Osaka (JP)

( * ) Notice: Subject to any disclaimer, the term of this patent is extended or adjusted under 35 U.S.C. 154(b) by 427 days.

(21) Appl. No.: 17/798,652

(22) PCT Filed: Aug. 24, 2020

(86) PCT No.: PCT/JP2020/031774
§ 371 (c)(1),
(2) Date: Aug. 10, 2022

(87) PCT Pub. No.: WO2021/171655
PCT Pub. Date: Sep. 2, 2021

(65) Prior Publication Data
US 2023/0150757 A1  May 18, 2023

(30) Foreign Application Priority Data
Feb. 26, 2020 (JP) .................................. 2020-030326

(51) Int. Cl.
*B65D 85/804* (2006.01)
*A47J 31/02* (2006.01)
*A47J 31/06* (2006.01)

(52) U.S. Cl.
CPC .......... *B65D 85/8061* (2020.05); *A47J 31/02* (2013.01); *A47J 31/0626* (2013.01)

(58) Field of Classification Search
CPC .... B65D 85/8061; A47J 31/02; A47J 31/0626
See application file for complete search history.

(56) References Cited

U.S. PATENT DOCUMENTS

2004/0168578 A1* 9/2004 Saitoh ................. A47J 31/0626
99/279
2016/0318705 A1* 11/2016 Saitoh ................. A47J 31/0626

FOREIGN PATENT DOCUMENTS

| CN | 1547443 A | 11/2004 |
| CN | 107296499 A | 10/2017 |

(Continued)

OTHER PUBLICATIONS

Jul. 5, 2021 Office Action issued in Japanese Patent Application No. 2020-214016.

(Continued)

*Primary Examiner* — Nikki H. Dees
*Assistant Examiner* — Chaim A Smith

(57) ABSTRACT

A drip bag includes a bag main body formed of a water permeable filter sheet and hooking members made of a thin plate-like material on two opposite outer surfaces. Each hooking member includes upper bonded, central, and a pair of arm portions from the central to toward the upper bonded portion, and a pair of hooking portions. The arm portions are spaced apart from each other with a bag main body width center line between them. Each hooking portion extends downward and is not bonded onto the bag main body. Each arm portion can be pulled up from the bag main body at an upper part, and has a fixed edge fixed onto the bag main body at a lower part. The fixed edge is inclined relative to a bag main body width direction. A bag main body opening portion opens wider even when a cup opening diameter is small.

7 Claims, 17 Drawing Sheets

(56) References Cited

FOREIGN PATENT DOCUMENTS

| | | |
|---|---|---|
| JP | 3674486 B2 | 7/2005 |
| JP | 4079041 B2 | 4/2008 |
| JP | 5858172 B2 | 2/2016 |
| JP | 5892262 B2 | 3/2016 |
| JP | 2016-105822 A | 6/2016 |
| WO | 03/011089 A1 | 2/2003 |
| WO | 2014/091567 A1 | 6/2014 |
| WO | 2014-092122 A1 | 6/2014 |

OTHER PUBLICATIONS

Nov. 2, 2020 International Search Report issued in International Patent Application No. PCT/JP2020/031774.
Aug. 30, 2022 International Preliminary Report on Patentability issued in International Patent Application No. PCT/JP2020/031774.
Feb. 15, 2024 Office Action issued in Taiwanese Patent Application No. 109128829.
Feb. 21, 2025 Office Action issued in Korean Patent Application No. 10-2022-7024318.
Nov. 30, 2023 Office Action issued in Chinese Patent Application No. 202080097675.6.

\* cited by examiner

WIDTH DIRECTION OF BAG MAIN BODY

DRIP BAG

TECHNICAL FIELD

The present invention relates to a drip bag that can be easily used to obtain an extraction liquid such as coffee, black tea, green tea, and herbal medicine by hooking the drip bag onto the top of a container such as a cup.

BACKGROUND ART

Conventionally, as drip bags that enable easy enjoyment of drip coffee, drip bags that are provided with hooking portions made of thin plate-like materials on two opposite surfaces of a bag main body made of a water permeable filter sheet, to enable the drip bag to be hooked onto an opening wall of a cup by opening a top end portion of the bag main body and pulling the hooking portions in opposite directions to each other, are widely used (Patent Literature 1). In these drip bags, one arm portion that can be pulled up from the bag main body is connected to the hooking portions.

For such drip bags, it has been proposed to form specific folding lines in the thin plate-like materials provided along an opening portion of the bag main body, and to provide two arm portions that are to be pulled up from the bag main body, such that the opening portion of the bag main body opens wider (Patent Literatures 2 and 3).

CITATION LIST

Patent Literature

Patent Literature 1: Japanese Patent No. 4079041
Patent Literature 2: Japanese Patent No. 5892262
Patent Literature 3: Japanese Patent No. 5858172

SUMMARY OF INVENTION

Technical Problem

In the conventional drip bags described above, the opening portion of the bag main body opens wide when the drip bag is hooked onto a cup with a large opening diameter. However, when the drip bag is hooked onto a cup with a small opening diameter, the opening portion of the bag main body opens small, so that it becomes difficult to pour hot water into the opening portion. More specifically, for example, when a drip bag 1x described in Patent Literature 2, as illustrated in FIG. 20A, is hooked onto a cup 100A with a large opening diameter by pulling hooking portions 23 on the front and back of a bag main body 10 in opposite directions to each other, as illustrated in FIGS. 20B and 20C, the center of the bag main body 10 is pulled to the side closer to an opening wall of the cap 100A at central portions 21 with which lower ends of arm portions 22 pulled up from the bag main body 10 are continuous, so that the opening portion of the bag main body 10 opens wide. However, when the drip bag 1x is hooked onto a cup 100B with a small opening diameter, as illustrated in FIGS. 21A and 21B, the opening portion of the bag main body 10 opens small even though the arm portions 22 are pulled up from the bag main body 10.

The present invention aims at providing a drip bag having hooking portions on two opposite surfaces of a bag main body to be pulled in opposite directions to each other and hooked onto an opening wall of a cup or another container, in which an opening portion of the bag main body is capable of opening wider than before, even when an opening diameter of the cup or the like is small.

Solution to Problem

The present inventor has found that the reason why, when a conventional drip bag is hooked onto a cup with a small opening diameter, an opening portion of a bag main body opens small even though arm portions are pulled up from the bag main body is because lower ends of the arm portions are easily bent against the bag main body and the bag main body is not easily pulled by the lower portions of the arm portions. To address this, the present inventors have discovered that it is effective to shift the positions of the lower ends of left and right sides of the arm portions in a vertical direction of the bag main body such that the lower ends of the arm portions do not bend easily when the arm portions are pulled up. As a result, the present inventors have conceived of the present invention.

Specifically, the present invention provides a drip bag including:
 a bag main body formed of a water permeable filter sheet; and
 hooking members made of a thin plate-like material provided on two opposite outer surfaces of the bag main body, wherein
 each of the hooking members provided on the two surfaces includes:
  an upper bonded portion provided along an upper side of the bag main body;
  a central portion provided in the center of the hooking member, the central portion being unable to be pulled up from the bag main body;
  a pair of arm portions provided from the central portion to a direction toward the upper bonded portion, the pair of arm portions being spaced apart from each other with a center line of a width of the bag main body located between them; and
  a pair of hooking portions continuous with upper parts of the arm portions, the pair of hooking portions each extending between a side of the bag main body and the arm portion downward in the bag main body, the pair of hooking portions being not bonded onto the bag main body, and
 each of the arm portions is capable of being pulled up from the bag main body at an upper part thereof, each of the arm portions has a fixed edge fixed onto the bag main body at a lower part thereof, and the fixed edge is inclined with respect to a width direction of the bag main body or extends downward vertically with respect to the width direction of the bag main body from a lower end of a side, closer to the side of the bag main body, out of left and right sides of each of the arm portions.

The fixed edge of the arm portion does not mean an edge that forms the outline of the arm portion, but a virtual edge that is a straight line connecting lower end portions of both the two sides of the arm portion. This fixed edge is fixed onto the bag main body and cannot be pulled up from the bag main body. The fixed edge fixed onto the bag main body does not necessarily mean that the fixed edge is bonded to the bag main body. The fixed edge fixed onto the bag main body means to include a case in which the fixed edge is floating from the surface of the bag main body, as long as the position of the fixed edge on the bag main body is constant by bonding surroundings of the fixed edge.

Advantageous Effects of Invention

According to the drip bag of the present invention, the fixed edge at the lower part of the arm portion is inclined with respect to the width direction of the bag main body, or extends downward vertically with respect to the width direction of the bag main body from the lower end of, out of the sides of the arm portion, the side closer to the side of the bag main body. Thus, when the hooking portions on the two opposite surfaces of the bag main body are pulled up from the bag main body and pulled in opposite directions to each other, the lower parts of the arm portions are twisted and become difficult to bend. Thus, a tensile force not only bends the lower ends of the arm portions to move the upper ends of the arm portions in a pulling direction, but also moves the bag main body in the pulling direction at portions where the lower ends of the arm portions are fixed. As a result, the arm portions are pulled up from the bag main body while the lower ends of the arm portions pull the bag main body. Therefore, even when an opening diameter of a cup is small and the length of pulling the hooking portions in the opposite directions is short, an opening portion of the bag main body can be opened wider than before, thus facilitating pouring hot water into the drip bag.

DESCRIPTION OF EMBODIMENTS

Figure 1:
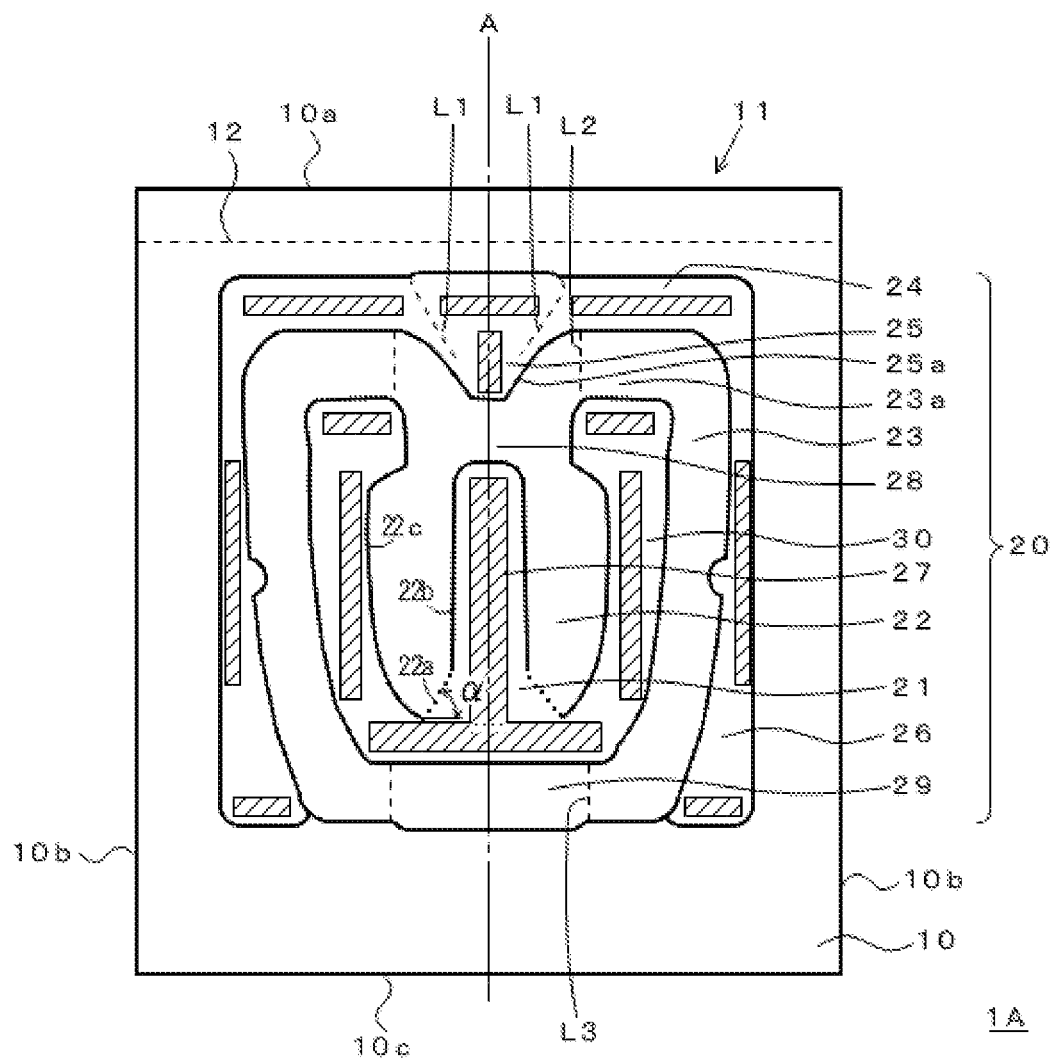
FIG. 1 is a plan view of a drip bag 1A according to an embodiment.
Figure 1:

The present invention will be described in detail below with reference to the drawings. In each drawing, the same reference numerals indicate identical or equivalent components.

Overall Configuration of Drip Bag

Figure 2:
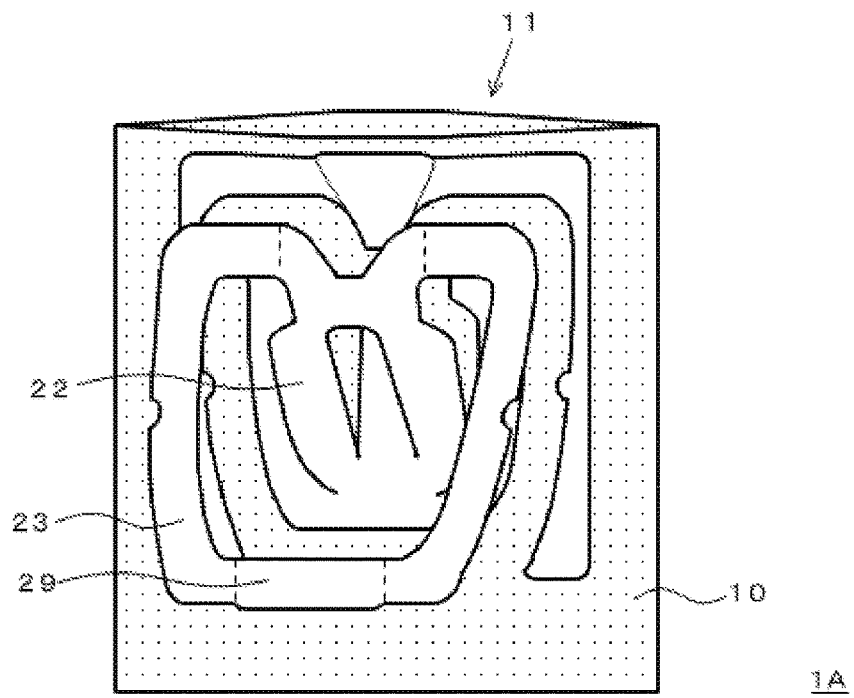
FIG. 2 is a perspective view of the drip bag 1A according to the embodiment after being opened, in a state of starting pulling up hooking portions.
Figure 3:
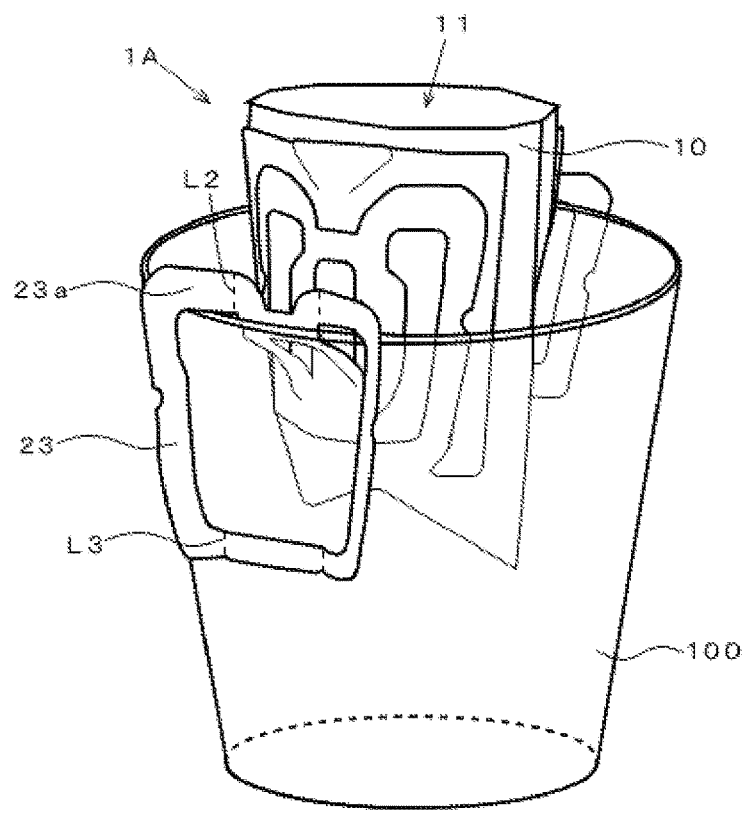
FIG. 3 is a perspective view of the drip bag 1A according to the embodiment after being opened, in a state of being hooked onto a cup.
Figure 4:
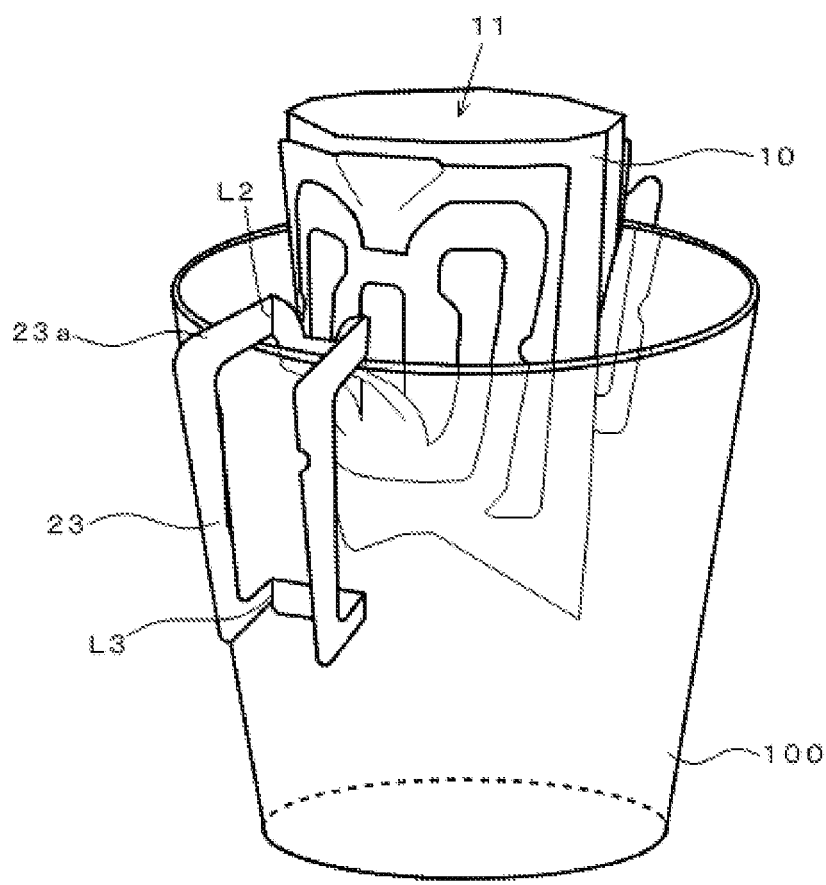
FIG. 4 is a perspective view of the drip bag 1A according to the embodiment after being opened, in a state of being hooked onto the cup with hooking portions folded.

FIG. 1 is a plan view of a drip bag 1A according to an embodiment of the present invention in an unopened state. FIG. 2 is a perspective view of the drip bag 1A after being opened, in a state of starting pulling up hooking portions 23. FIG. 3 is a perspective view of the drip bag 1A in a state of being hooked onto a cup 100. FIG. 4 is a perspective view of the drip bag 1A hooked onto the cup, with the hooking portions 23 of the drip bag 1A folded. In FIG. 1, diagonally hatched portions represent bonded regions in which a hooking member 20 is bonded to a bag main body 10. The bonded regions are not limited to the illustrated mode. Due to the opacity of the hooking member 20, the bonded regions cannot usually be visually observed from an outer surface of the bag main body 10.

The drip bag 1A has the bag main body 10 formed of a water permeable filter sheet, and the hooking members 20 made of a thin plate-like material provided on two opposite outer surfaces of the bag main body 10. The bag main body 10 is filled with an extraction material, and an opening portion 11 of the bag main body 10 is closed.

Each of the hooking members 20 on the front and back of the bag main body 10 has an upper bonded portion 24 provided along an upper side of the bag main body 10, a central portion 21 provided in the center of the hooking member 20 so as not to be pulled up from the bag main body 10, a pair of arm portions 22 that extend from the central portion 21 to a direction of the upper bonded portion 24 and that are spaced apart from each other with a center line A of the width of the bag main body 10 located between them, and a pair of hooking portions 23 each of which is continuous with an upper part of the arm portion 22 and extends between a side 10b of the bag main body and the arm portion 22 downward in the bag main body 10. The hooking portions 23 are not bonded to the bag main body 10. The pair of arm portions 22 can be pulled up from the bag main body 10 at upper parts thereof. The pair of arm portions 22 each have a fixed edge 22a, which is fixed onto the bag main body 10 at a lower part thereof. The fixed edge 22a is inclined with respect to a width direction of the bag main body.

In the drip bag 1A of the present embodiment, the hooking members 20 are independently provided on two opposite surfaces of the bag main body 10 and the hooking members 20 are symmetrically formed, but in the present invention, the hooking members 20 on the two opposite surfaces of the bag main body 10 may be continuous with each other.

Bag Main Body

The bag main body 10 is formed of a water permeable filter sheet, and filled with coffee powder as an extraction material.

As the water permeable filter sheet forming the bag main body 10, for example, various types of sheet that are capable of leaching coffee when a predetermined amount of coffee powder is filled and hot water is poured can be used. Generally, as the sheet for leaching, for example, a woven or non-woven fabric made of synthetic fibers such as polyester, nylon, polyethylene, polypropylene, and vinylon, semi-synthetic fibers such as rayon, and natural fibers such as broussonetia and edgeworthia chrysantha individually and in composites, paper including mixed paper made of Manila hemp, wood pulp, polypropylene fibers, and the like, tea bag base paper, metal mesh sheet; and the like are known, and these can be used in the present invention. However, from a viewpoint of disposability after use of the drip bag, biodegradable fibers are preferably contained in the water permeable filter sheet material. Examples of the biodegradable fiber include polylactic acid, polybutylene succinate, and polyethylene succinate. In order to provide a moderate steaming effect to the coffee powder when dripping, when producing the water permeable filter sheet from these fiber materials, the porosity of fiber layers is preferably adjusted so as to create a sparse-dense multi-layer structure in which a layer in direct contact with the coffee powder is made "sparse" and a layer not in direct contact with the coffee powder is made "dense". It is preferable to increase the content of hydrophobic fibers in the layer that is in direct contact with the coffee powder, and to decrease the content of hydrophobic fibers in the layer that is not in direct contact with the coffee powder (Japanese Patent No. 3674486).

In the present embodiment, the bag main body 10 is a rectangular flat bag in plan view with an upper side 10a and left and right sides 10b sealed, and has two opposite surfaces. In the vicinity of the upper side 10a of the bag main body 10, an opening guide line 12 is formed along the upper side 10a. As the opening guide line 12, perforations or the like can be formed. As the perforations, micro-perforations are preferred from the viewpoint of facilitating opening. Instead of the perforations for opening, a seal at the upper side 10a of the bag main body may be a weak seal. That is, the seal strength of the upper side 10a is made weaker than seal strengths of the other sides of the bag main body 10 so that the upper side 10a of the bag main body 10 may easily open by pulling the hooking portions 23 provided on the two opposite surfaces of the bag main body 10 in opposite directions to each other, although the seal does not peel off unintendedly except in opening operation. In the present invention, a bottom portion and side portions of the bag main body 10 may be gusseted as necessary.

The net planar dimension of the bag main body 10 can be appropriately set according to the size of a cup or container onto which the drip bag is to be hooked. For example, the net planar dimension should be large enough to be used with commercially available coffee cups.

Hooking Member

The hooking member 20 can be formed by, for example, punching out the thin plate-like material such as paperboard, plastic sheet, thin metal sheet, or the like. The thin plate-like material is also preferably formed of a biodegradable material such as polylactic acid, polybutylene succinate, or polyethylene succinate, from the viewpoint of disposability after use of the drip bag 1A.

The hooking member 20 has the upper bonded portion 24 provided along the upper side 10a of the bag main body 10. The upper bonded portion 24 is bonded to the bag main body 10, but the bonded region need not be the entire surface of the upper bonded portion 24. For example, as illustrated in FIG. 1, line-shaped bonded regions can be provided intermittently.

In the present invention, the upper bonded portion 24 may be formed as a band shape with a constant width, but as illustrated in FIG. 1, the upper bonded portion 24 preferably includes a protruding portion 25 in which a central portion thereof in the width direction of the bag main body 10 protrudes downward, and a pair of oblique folding lines L1 provided with the center line A of the width of the bag main body 10 located between them. The oblique folding lines L1 each preferably are a line extending in a direction away from the center line A from a lower part of the protruding portion 25 to an upper side of the upper bonded portion 24, without touching an edge side 25a of the protruding portion 25. This allows bending of the upper bonded portion 24 at the oblique folding lines L1 by pulling the hooking portions 23 provided on the two opposite surfaces of the bag main body 10 in opposite directions to each other, so that an opening shape of the bag main body 10 becomes polygonal of octagonal or more, and an opening area can be expanded.

In the present embodiment, there is no folding line formed on the upper bonded portion 24 of the drip bag 1A, other than the oblique folding lines L1. This enables an opening portion of the bag main body to be opened wider and the opening shape to be closer to a circle than when vertical folding lines of the bag main body are formed just below the oblique folding lines L1.

The oblique folding lines L1 can be formed by perforations, half-cutting, streak pressing, or the like. The oblique folding lines L1 can also be formed by cut lines through the front and back of the hooking member 20 so that the upper bonded portion 24 is easily folded at the oblique folding lines L1, as long as underlying water permeable filter sheet of the bag main body 10 is continuous.

From left and right ends of the upper bonded portion 24, reinforcing portions 26 extend along the sides 10b of the bag main body 10 toward the bottom side of the bag main body. In the present invention, the reinforcing portions 26 are provided as necessary.

In the present invention, the central portion 21 is a portion that is provided at the center of the hooking member 20 and cannot be pulled up from the bag main body 10. The central portion 21 is preferably provided on the center line of the width of the hooking member 20, but is not limited thereto. In order to make the central portion 21 unable to be pulled up from the bag main body, a bonded region, which is bonded to the bag main body 10, may be formed in the central portion 21, as with the drip bag 1A of the present embodiment, or regions connected to the top and bottom of the central portion 21 may be bonded to the bag main body 10 while the central portion 21 itself may not be bonded to the bag main body 10.

From the left and right sides of the central portion 21, the pair of arm portions 22 are provided to the direction of the upper bonded portion 24 with the center line A located between them. The arm portions 22 are separated by a central bonded portion 27 extending upward from the central portion 21.

Each of the arm portions 22 can be pulled up from the bag main body 10. An upper part of each of the arm portions 22 is continuous with the hooking portion 23. In a lower part of each of the arm portions 22, the fixed edge 22a fixed onto the bag main body 10 is formed.

The reason why the pair of arm portions 22 are provided with the center line A located between them is, as described below, to make the fixed edges 22a at the lower parts of the arm portions 22 inclined with respect to the width direction of the bag main body. In contrast, if the central bonded portion 27 is omitted and a single arm portion is provided as described in FIG. 1 of Patent Literature 1 by connecting the arm portions on the left and right of the center line A, it becomes difficult to provide inclined fixed edges at a bottom part of the arm portion.

In the drip bag 1A according to the present embodiment, the fixed edges 22a are inclined with respect to the width direction of the bag main body. To make the fixed edges 22a inclined like this with respect to the width direction of the bag main body, in the drip bag 1A, one of both left and right sides of each arm portion 22, a side 22c closer to the side 10b of the bag main body is curved into an arc shape at an adjoining portion to the fixed edge 22a relative to the position of a lower end of a side 22b closer to the center line A, thereby shifting the position of the lower end of the side 22c to the side closer to the bottom side 10c of the bag main body.

Figure 5A:
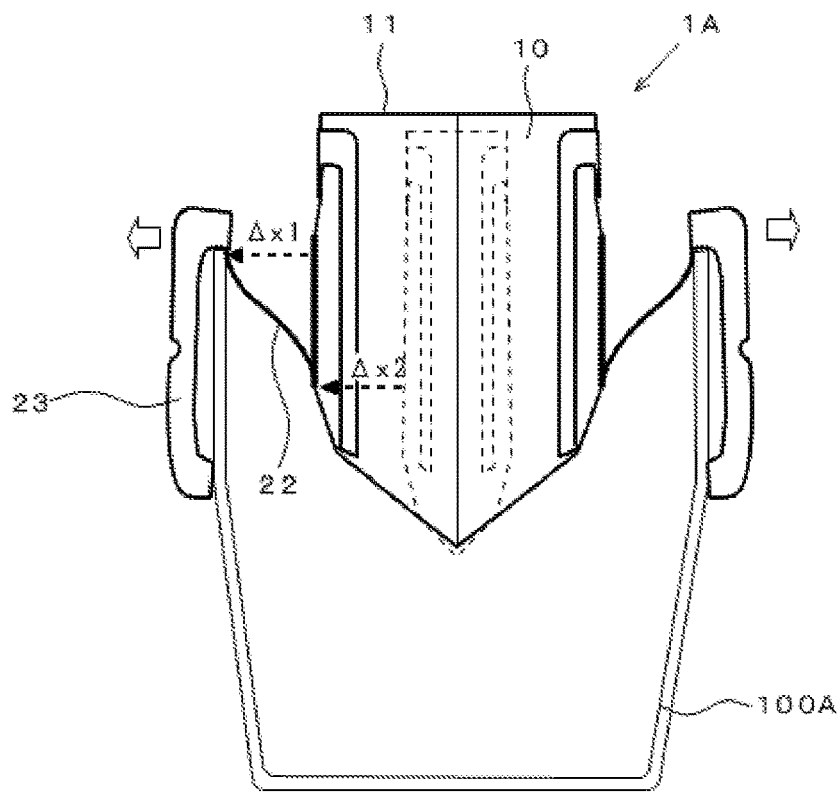
FIG. 5A is a side view of the drip bag 1A according to the embodiment after being opened, in a state of being hooked onto a cup with a large opening diameter.
Figure 5B:
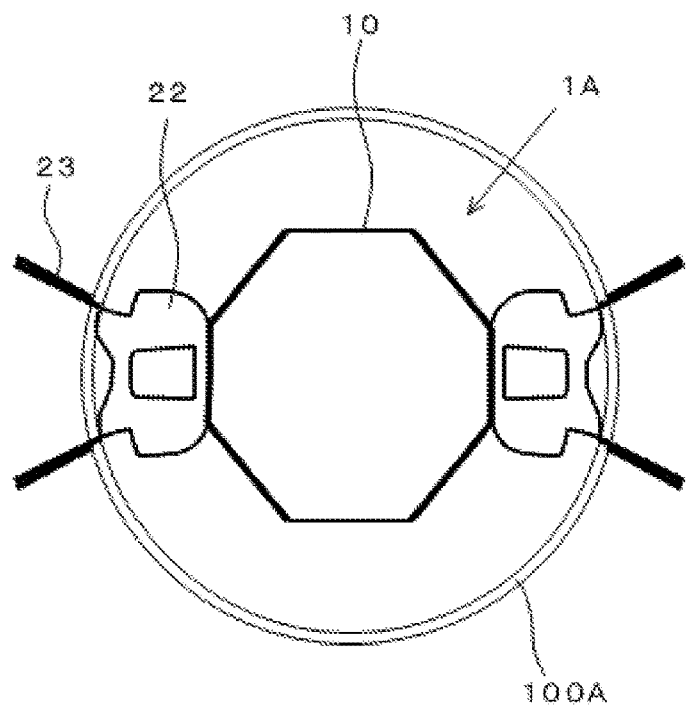
FIG. 5B is a top view of the drip bag 1A according to the embodiment after being opened, in a state of being hooked onto the cup with the large opening diameter.
Figure 6A:
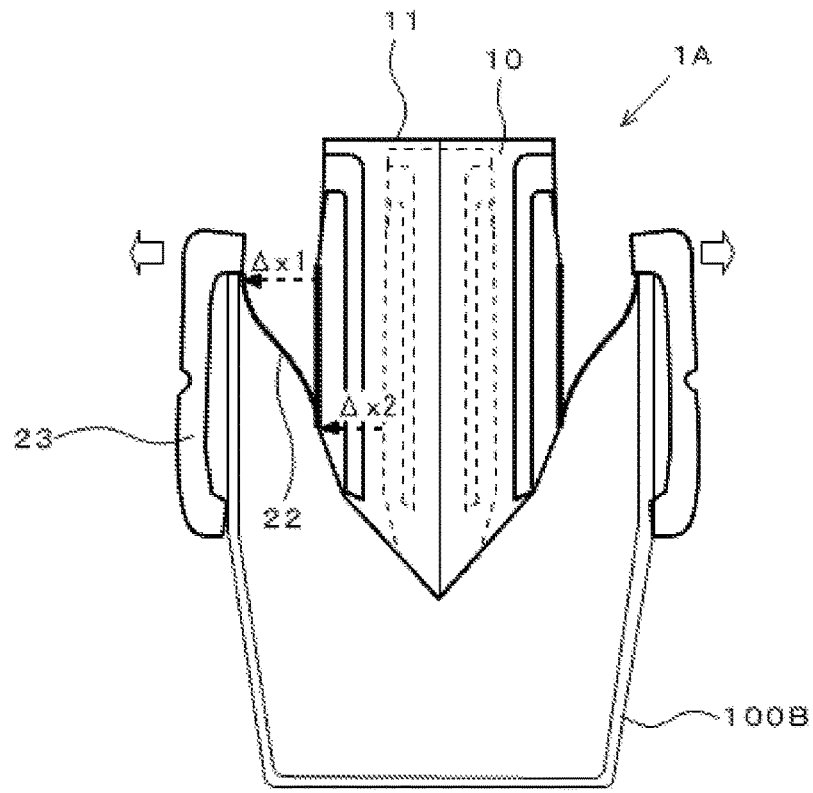
FIG. 6A is a side view of the drip bag 1A according to the embodiment after being opened, in a state of being hooked onto a cup with a small opening diameter.
Figure 6B:
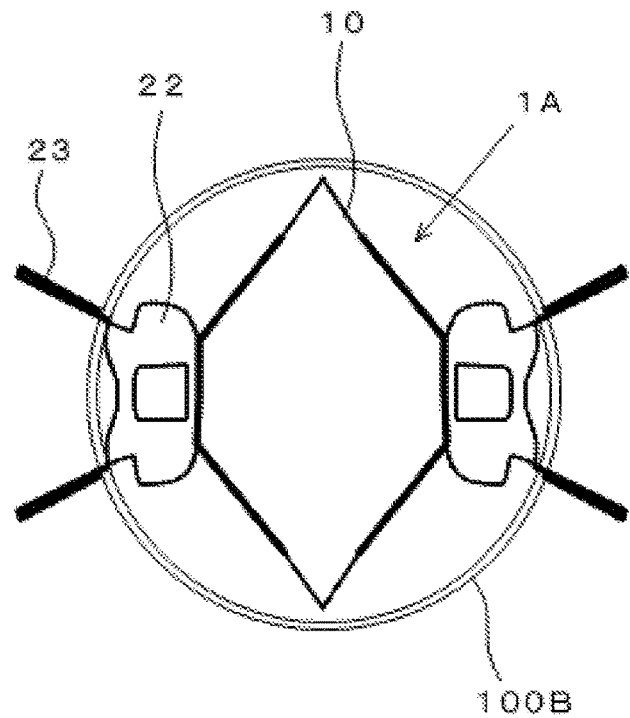
FIG. 6B is a top view of the drip bag 1A according to the embodiment after being opened, in a state of being hooked onto the cup with the small opening diameter.
Figure 21A:
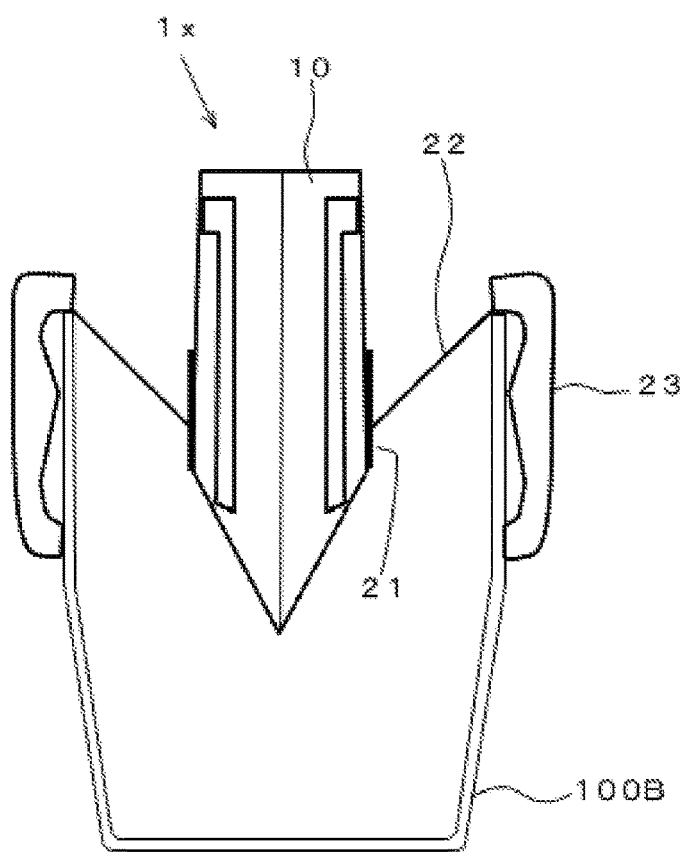
FIG. 21A is a side view of the conventional drip bag 1x being hooked onto a cup with a small opening diameter.
Figure 21B:
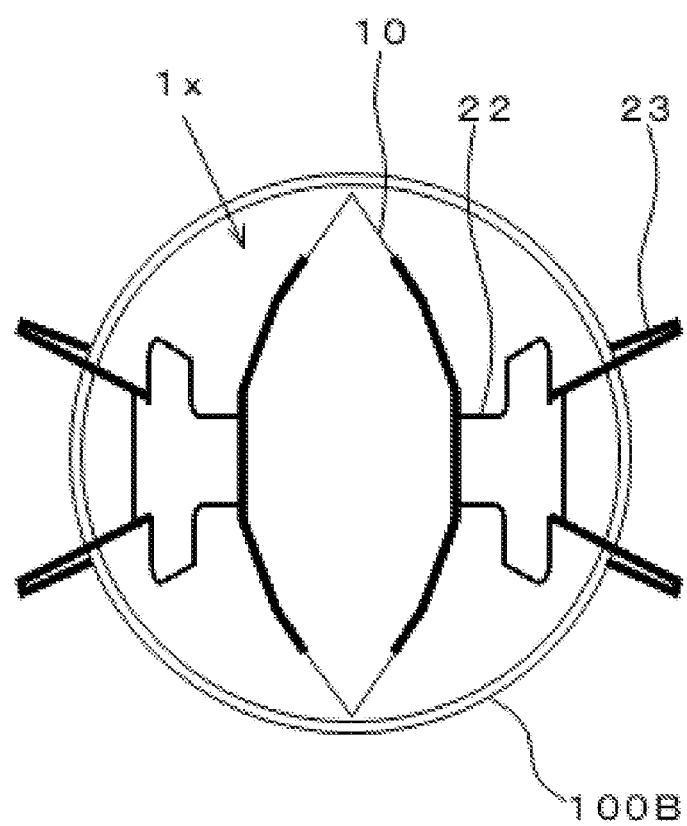
FIG. 21B is a top view of the conventional drip bag 1x being hooked onto the cup with the small opening diameter.

Due to this inclination of the fixed edges 22a, when the hooking portions 23 provided on the two opposite surfaces of the bag main body 10 are pulled in opposite directions to each other, a tensile force more strongly acts on, out of both left and right end portions of the fixed edge 22a of the arm portion 22, the end portion closer to the center line A than the end portion closer to the side 10b of the bag main body. The arm portion 22 is twisted and the lower part of the arm portion 22 becomes difficult to bend. Therefore, the tensile force not only bends the lower end of the arm portion 22 to move an upper end of the arm portion 22 in a pulling direction by a movement amount $\Delta x1$, but also moves the bag main body 10 at a portion fixed to the lower end of the arm portion 22 in the pulling direction by a movement amount $\Delta x2$. Therefore, the arm portions 22 are pulled up from the bag main body 10 while pulling the bag main body 10. Not only in a case in which, as illustrated in FIGS. 5A and 5B, the hooking portions 23 are hooked onto an opening wall of a cup 100A with a large opening diameter, but also in a case in which, as illustrated in FIGS. 6A and 6B, the hooking portions 23 are hooked onto an opening wall of a cup 100B with a small opening diameter, the arm portions 22 curve in the shape of the letter S in side view (FIGS. 5A and 6A). As a result, the two opposite surfaces of the bag main body 10 are pulled in the opposite directions to each other by the lower parts of the arm portions 22, thus resulting in wide opening of the opening portion of the bag main body 10. This advantageous effect is remarkable with the use of the cup 100B with the small opening diameter compared with the conventional drip bag (FIGS. 21A and 21B). Thus, according to this drip bag 1A, the opening portion 11 of the bag main body 10 can be opened wide, regardless of the cup opening diameter, thus facilitating pouring hot water into the drip bag 1A.

When the fixed edge 22a of the arm portion 22 is inclined with respect to the width direction of the bag main body, the inclination angle $\alpha$ (FIG. 1) is preferably 30° or more from the viewpoint of obtaining the advantageous effect of the present invention.

The pair of arm portions 22 provided with the center line A located between them are connected to each other at upper parts thereof by an upper connecting portion 28. The provision of the upper connecting portion 28 prevents the pair of hooking portions 23 from coming apart when the pair of hooking portions 23, which are continuous with the upper parts of the pair of arm portions 22, are hooked onto the opening wall of the cup or the like, thereby facilitating hooking the hooking portions 23 onto the opening wall of the cup or the like.

In the present invention, the hooking portions 23 are continuous with the upper parts of each of the arm portions 22 provided on the left and right of the center line A. In the drip bag 1A according to present embodiment, the hooking portion 23 is continuous with the upper part of the arm portion 22 at one end of the upper part of the hooking portion 23, has a portion 23a extending in the width direction of the bag main body at a middle of the upper part of the hooking portion 23, and extends between the arm portion 22 and the reinforcing portion 26 downward in the bag main body 10 at the other end of the hooking portion 23. The provision of the portions 23a extending in the width direction of the bag main body at the upper parts of the hooking portions 23, as illustrated in FIGS. 3 and 4, stabilizes hooking of the hooking portions 23 onto the opening wall of the cup 100. In addition, vertical folding lines L2 are formed in the upper parts of the hooking portions 23, and vertical folding lines L3 are formed in lower parts of the hooking portions 23 on an extended line of the vertical folding lines L2 in the upper parts. This facilitates folding the hooking portions 23 as illustrated in FIG. 4. These folding lines L2 and L3 can also be formed by perforations, half-cutting, streak pressing, or the like.

The pair of hooking portions 23 located on the left and right of the center line A are connected at lower parts thereof by a lower connecting portion 29. This facilitates operation of hooking the pair of hooking portions 23 onto the opening wall of the cup or the like.

Second central bonded portions 30 are each formed between the arm portion 22 and the hooking portion 23. With this configuration, end portions of the arm portions 22 on the side closer to the fixed edges 22a can each be enclosed by the central portion 21, the central bonded portion 27, and the second central bonded portion 30. In particular, providing bonded regions to the bag main body in these portions that surround the end portions of the arm portions 22 on the side closer to the fixed edges 22a is preferred because the stability of the arm portions 22 is improved in the direction of pulling up the arm portions 22.

Variations of Drip Bag

Figure 7:
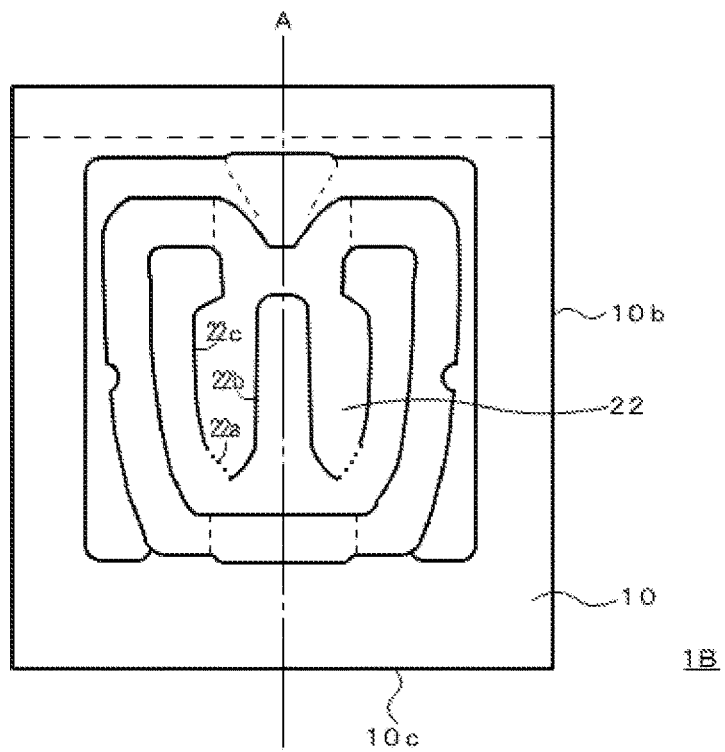
FIG. 7 is a plan view of a drip bag 1B according to an embodiment.

The drip bag of the present invention can take various forms. For example, in comparison to the drip bag 1A illustrated in FIG. 1, a drip bag 1B illustrated in FIG. 7 is prepared by curving the side 22b, one of both sides of each arm portion 22, closer to the center line A at the adjoining portion to the fixed edge 22a into an arc shape and shifting the position of the lower end of the side 22b to the side closer to the bottom side 10c of the bag main body than the position of the lower end of the side 22c closer to the side 10b of the bag main body to incline the fixed edge 22a of the arm portion 22. Also, in this drip bag 1B, by pulling the hooking portions 23 provided on the two opposite surfaces of the bag main body 10 in the opposite directions to each other, the lower parts of the arm portions 22 are twisted, thus making it difficult to form folding lines in the width direction of the bag main body at the lower parts of the arm portions 22. As a result, even in a case in which the drip bag 1B is hooked onto a cup with a small opening diameter, the opening portion 11 of the bag main body opens wide, which facilitates pouring hot water.

Figure 8:
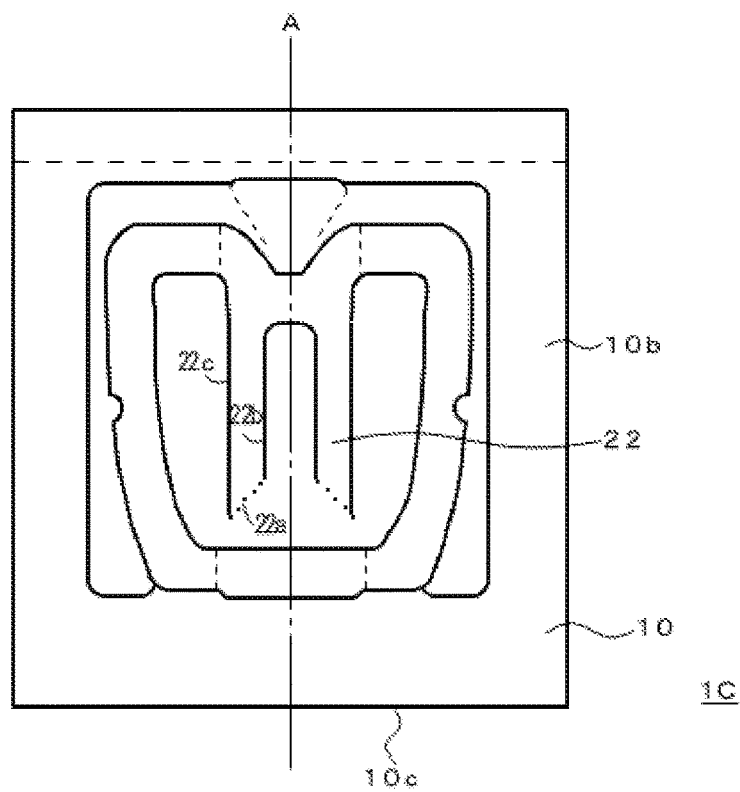
FIG. 8 is a plan view of a drip bag 1C according to an embodiment.
Figure 9:
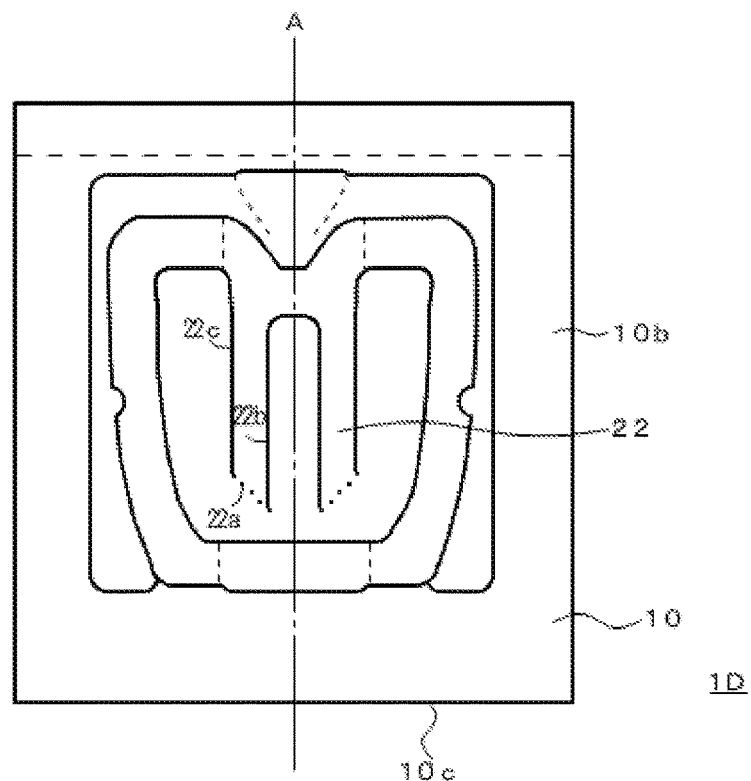
FIG. 9 is a plan view of a drip bag 1D according to an embodiment.

In comparison to the drip bag 1A illustrated in FIG. 1, a drip bag 1C illustrated in FIG. 8 is prepared by making one side 22c of each arm portion 22 straight without curving the side 22c in an arc shape at the adjoining portion to the fixed edge 22a and shifting the position of the lower end thereof to the side closer to the bottom side of the bag main body than the position of the lower end of the other side 22b to incline the fixed edge 22a. Also, in comparison to the drip bag 1A illustrated in FIG. 1, a drip bag 1D illustrated in FIG. 9 is prepared by making one side 22b of each arm portion 22 straight without curving the side 22b in an arc shape at the adjoining portion to the fixed edge 22a and shifting the position of the lower end thereof to the side closer to the bottom side of the bag main body than the position of the lower end of the other side 22c to incline the fixed edge 22a. In these manners, the shape of the lower part of the arm portion 22 adjoining to the fixed edge 22a may be straight or curved.

Figure 10:
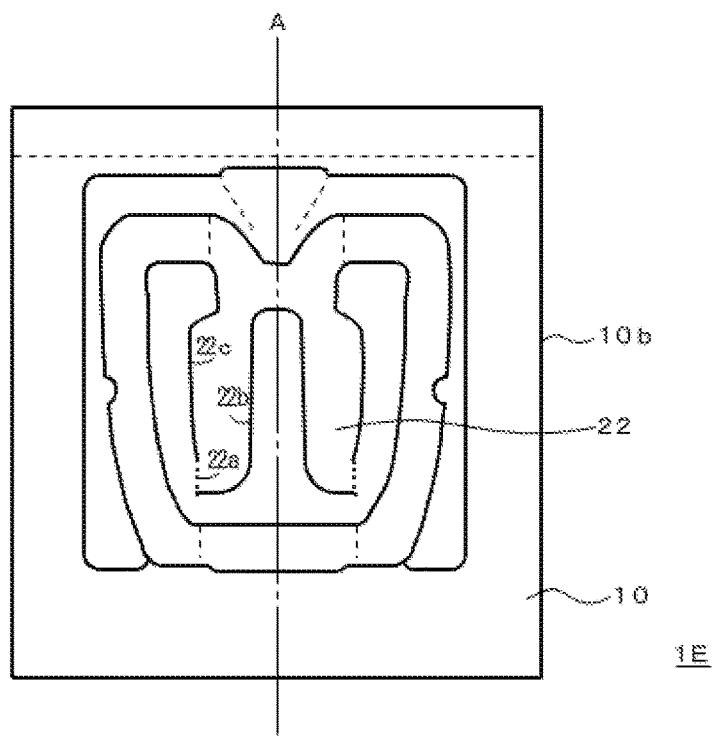
FIG. 10 is a plan view of a drip bag 1E according to an embodiment.

In a drip bag 1E illustrated in FIG. 10, in contrast to the above-described drip bags 1A, 1B, 1C, and 1D, the fixed edge 22a is not inclined with respect to the width direction of the bag main body, and the fixed edge 22a extends downward vertically with respect to the width direction of the bag main body from the lower end of the side 22c closer to the side 10b of the bag main body, out of sides 22b and 22c of each arm portion 22. Even when the fixed edges 22a are formed in this manner, the lower parts of the arm portions 22 are twisted by pulling the hooking portions 23 provided on the two opposite surfaces of the bag main body 10 in the opposite directions to each other, thus making it difficult to form folding lines in the width direction of the bag main body at the lower parts of the arm portions 22. As a result, even in a case in which the drip bag 1E is hooked onto a cup with a small opening diameter, the opening portion 11 of the bag main body opens wide, which facilitates pouring hot water.

Figure 11:
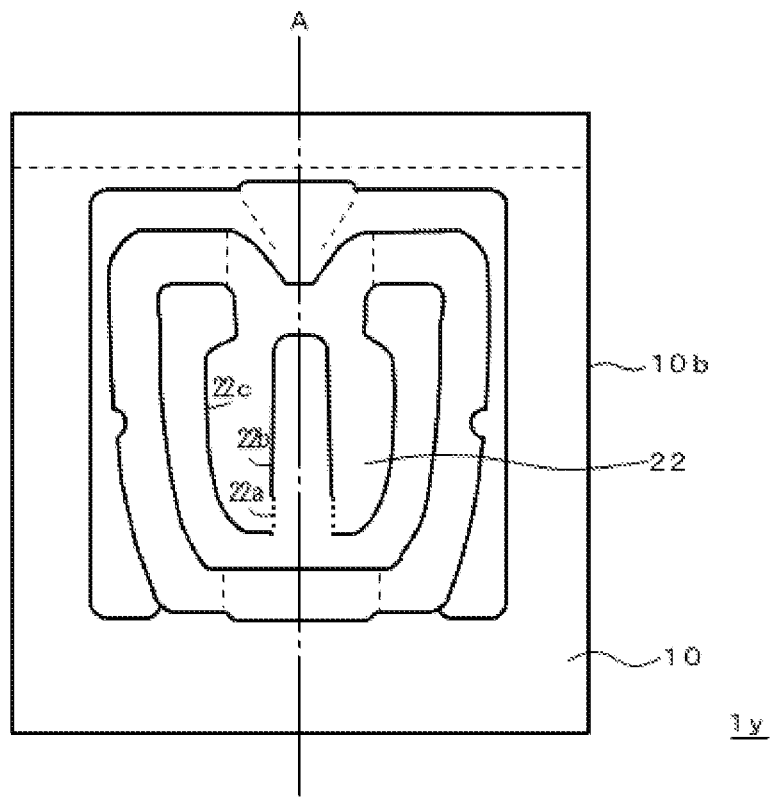
FIG. 11 is a plan view of a drip bag 1y according to a comparative example.

On the other hand, in a drip bag 1y illustrated in FIG. 11, the fixed edge 22a of the arm portion 22 extends downward vertically with respect to the width direction of the bag main body from the lower end of the side of each arm portion 22. However, since this fixed edge 22a extends downward from the side 22b closer to the center line A, one of the left and right sides 22b and 22c of each arm portion 22, the advantageous effect of the present invention cannot be obtained. This is presumably because when the hooking portions 23 provided on the two opposite surfaces of the bag main body 10 are pulled in opposite directions to each other, a tensile force is generally applied on the center line A of the width of the bag main body, so that the arm portion 22 of the drip bag 1E illustrated in FIG. 10 is twisted, while the arm portion 22 of the drip bag 1y illustrated in FIG. 11 is hardly twisted.

Figure 12:
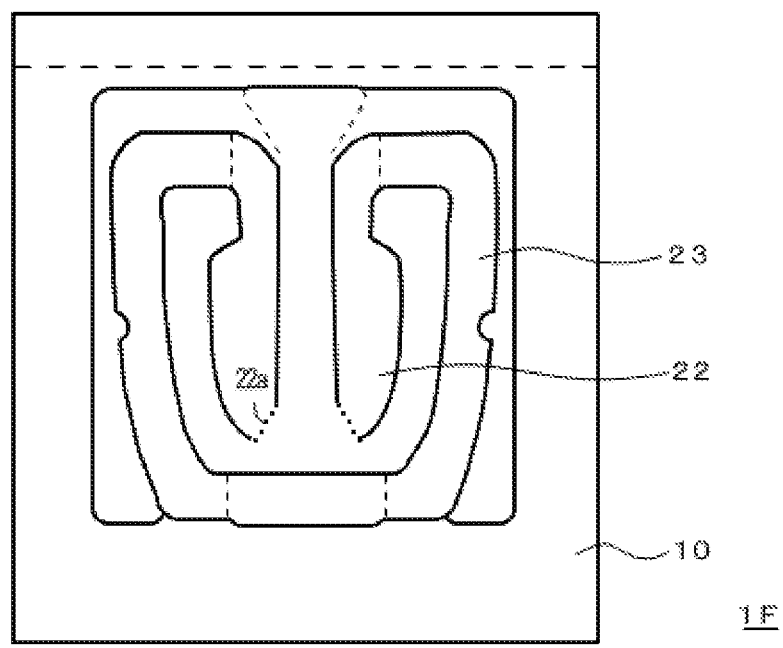
FIG. 12 is a plan view of a drip bag 1F according to an embodiment.

In comparison to the drip bag 1A illustrated in FIG. 1, a drip bag 1F illustrated in FIG. 12 is prepared by omitting the upper connecting portion 28. From the viewpoint of making it easier to hook the pair of hooking portions 23 on both the left and right sides of the center line A of the width of the bag main body onto the cup 100, the upper connecting portion 28 is preferably provided.

Figure 13:
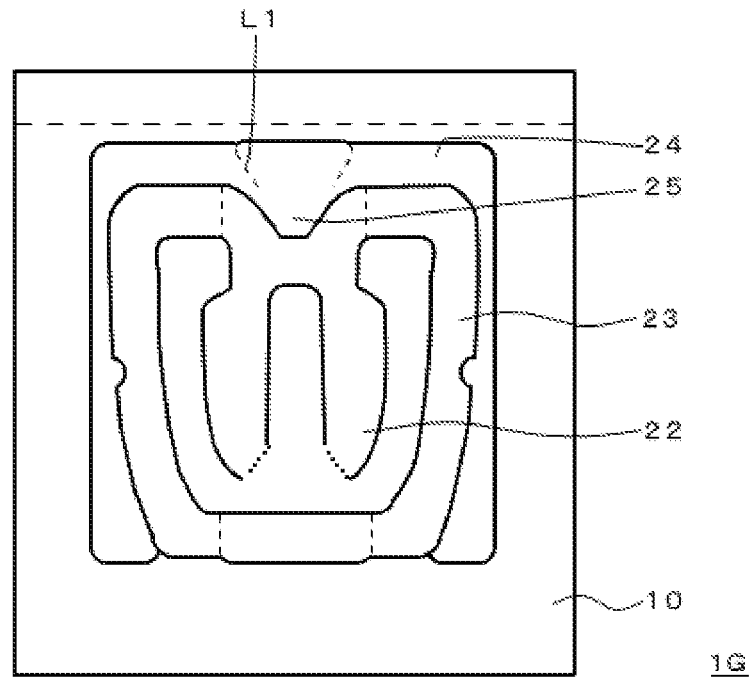
FIG. 13 is a plan view of a drip bag 1G according to an embodiment.

In comparison to the drip bag 1A illustrated in FIG. 1, a drip bag 1G illustrated in FIG. 13 is prepared by forming the oblique folding lines L1 of the upper bonded portion 24 on the side closer to the upper side 10a relative to the protruding portion 25. According to this drip bag 1G, in contrast to the drip bag 1A illustrated in FIG. 1, when the opening portion 11 of the bag main body 10 is opened by pulling the hooking portions 23 provided on the two opposite surfaces of the bag main body 10 in the opposite directions to each other, a portion along the upper bonded portion 24, out of the opening shape of the bag main body 10, tends to be straight, so that the opening shape of the bag main body is difficult to be polygonal of octagonal or more. However, when this drip bag 1G is hooked onto a cup with a small opening diameter, there is no practical problem with the ease of pouring hot water.

Figure 14:
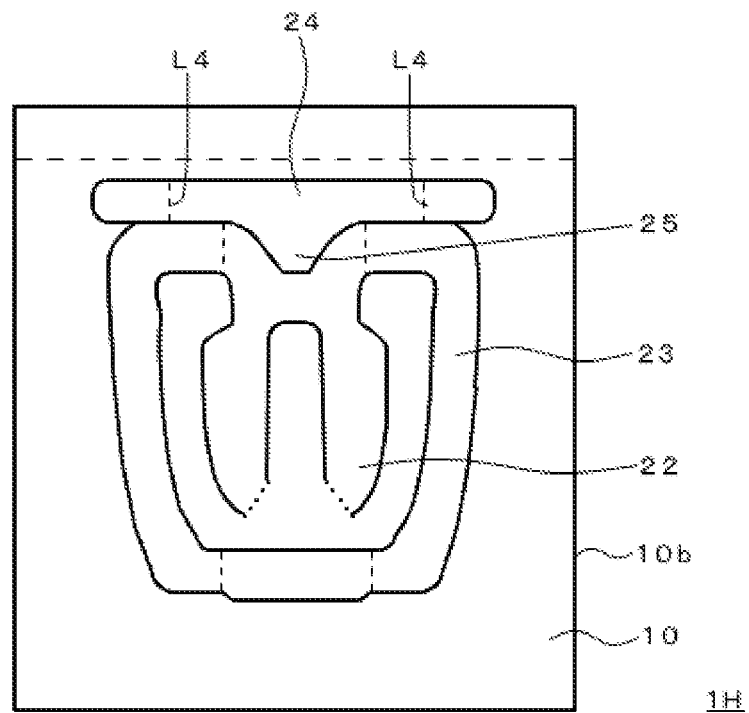
FIG. 14 is a plan view of a drip bag 1H according to an embodiment.

In comparison to the drip bag 1A illustrated in FIG. 1, a drip bag 1H illustrated in FIG. 14 is prepared by omitting the oblique folding lines L1 of the upper bonded portion 24, providing vertical folding lines L4 in the upper bonded portion 24 at portions closer to the sides 10b of the bag main body 10 than the protruding portion 25, and further omitting the reinforcing portions 26 therefrom. The provision of such vertical folding lines L4 in the upper bonded portion 24 facilitates opening of the bag main body 10 into a rectangular shape. However, when this drip bag 1H is hooked onto a cup with a small opening diameter, there is no practical problem with the ease of pouring hot water.

Figure 15:
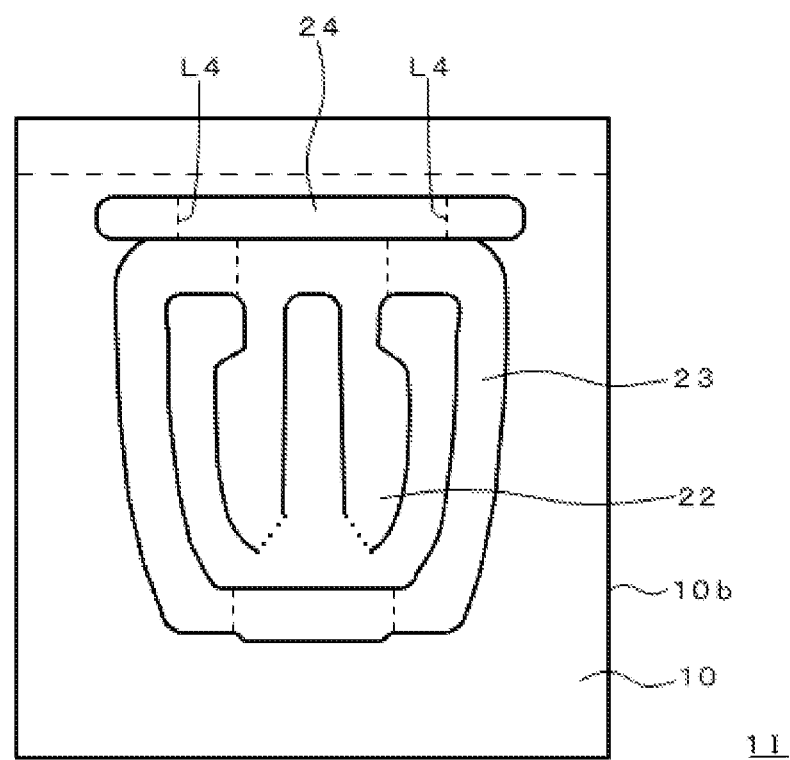
FIG. 15 is a plan view of a drip bag 1I according to an embodiment.

In comparison to the drip bag 1H illustrated in FIG. 14, a drip bag 1I illustrated in FIG. 15 is prepared by omitting the provision of the protruding portion 25 in the upper bonded portion 24. This drip bag 1I also has no practical problem with the ease of pouring hot water, when hooked onto a cup with a small opening diameter.

Figure 16A:
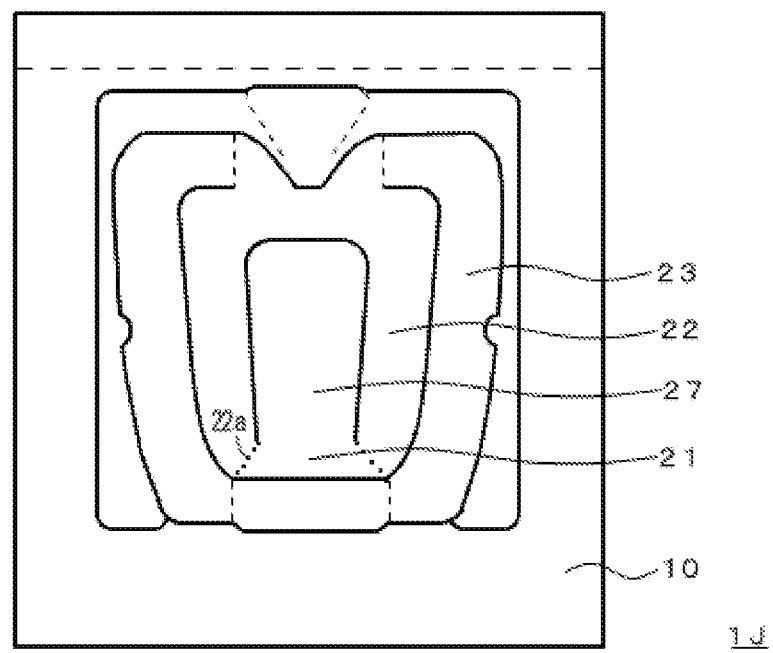
FIG. 16A is a plan view of a drip bag 1J according to an embodiment.

In comparison to the drip bag 1A illustrated in FIG. 1, a drip bag 1J illustrated in FIG. 16A is prepared by omitting the second central bonded portion 30, and widening the central bonded portion 27 and making the arm portions 22 and the hooking portions 23 adjacent to each other. This drip bag 1J also has no practical problem with the ease of pouring hot water, when hooked onto a cup with a small opening diameter.

Figure 16B:
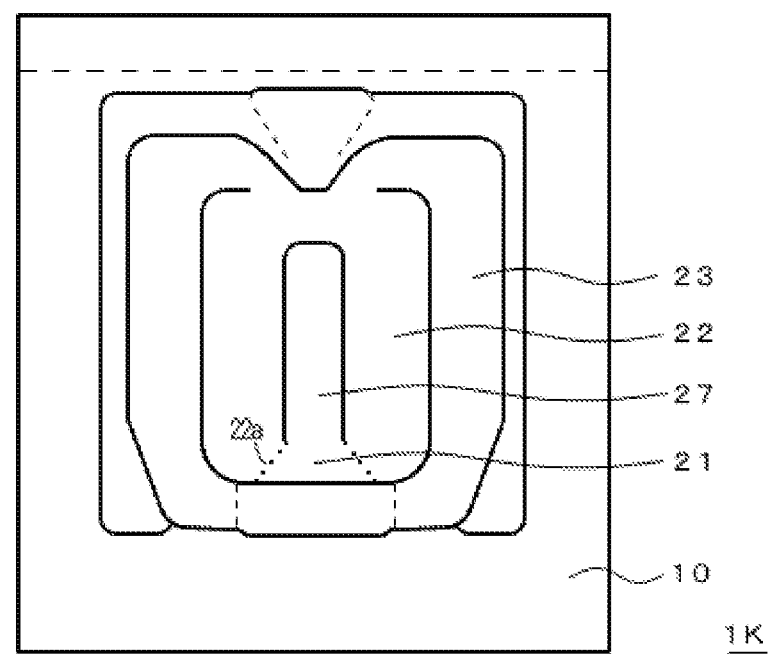
FIG. 16B is a plan view of a drip bag 1K according to an embodiment.

In comparison to the drip bag 1J illustrated in FIG. 16A, a drip bag 1K illustrated in FIG. 16B is prepared by widening the width of each of the arm portions 22 to increase the twist occurring in the fixed side 22a.

Figure 17:
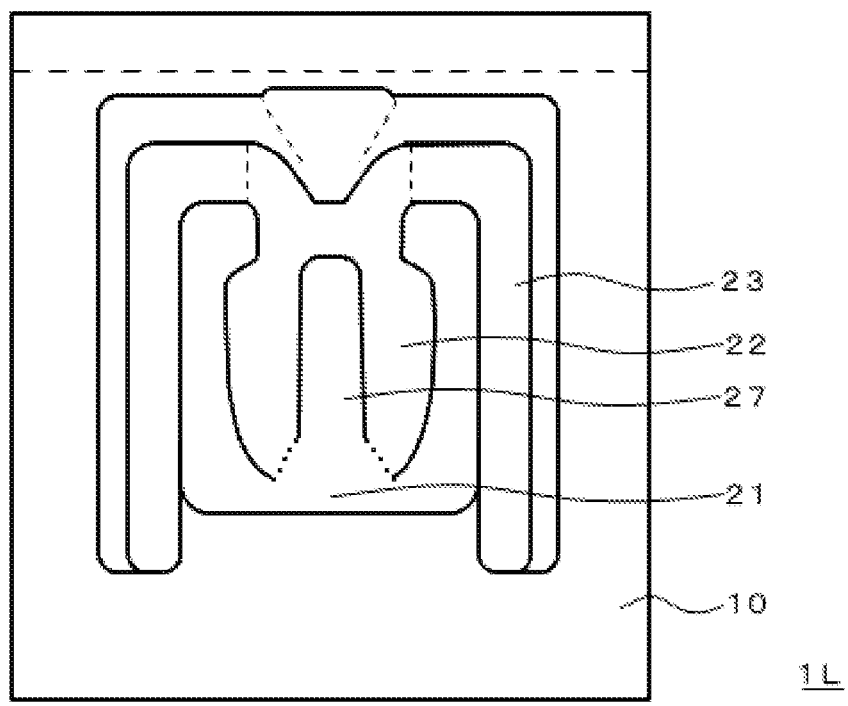
FIG. 17 is a plan view of a drip bag 1L according to an embodiment.

In comparison to the drip bag 1A illustrated in FIG. 1, a drip bag 1L illustrated in FIG. 17 is prepared by omitting the lower connecting portion 29 of the hooking portion 23. This drip bag 1L also has no practical problem with the ease of pouring hot water, when hooked onto a cup with a small opening diameter.

The above-described variations of the drip bag can be combined with one another as appropriate.

Drip Bag Usage

An aspect of the drip bag according to the present invention that is not filled with an extraction material can be used as a filter to be filled with an extraction material when obtaining an extraction liquid from the extraction material. On the other hand, as a use method of an aspect of the drip bag according to the present invention filled with an extraction material while the bag main body being closed, for example, the bag main body 10 is opened at the opening portion 11 when obtaining an extraction liquid, the hooking portions 23 on the two opposite surfaces of the bag main body are pulled in opposite directions to each other and hooked onto a cup, and hot water is poured into the opening portion 11 of the bag main body 10, thereby obtaining an extraction liquid. In this case, regardless of the opening diameter of a cup, the opening portion 11 of the bag main body 10 is formed to spread easily, facilitating pouring hot water.

Producing Method of Drip Bag

Figure 18:
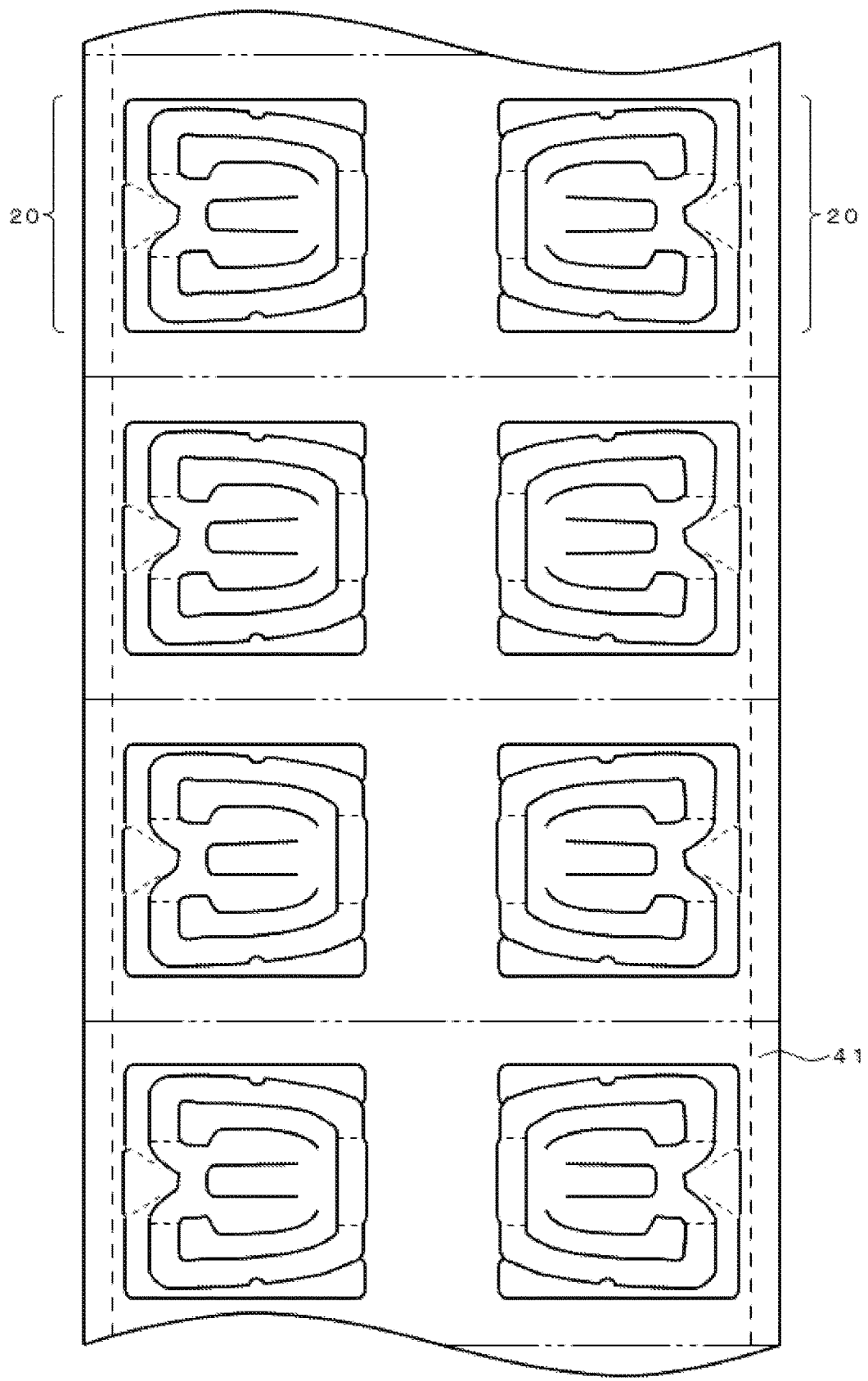
FIG. 18 is a plan view of a production sheet for the drip bag 1A according to the embodiment.

The drip bag according to the present invention can be produced by applying a drip bag production sheet to a known filling and packaging machine. For example, when producing the drip bag 1A illustrated in FIG. 1, a drip bag production sheet 40 illustrated in FIG. 18 is first prepared. In this drip bag production sheet 40, a pair of the hooking members 20 is arranged in a long water permeable filter sheet 41 with portions on the side closer to the bottom portion facing each other and with portions on the side closer to the opening portion being directed to sides of the long water permeable filter sheet 41 with a predetermined spacing therebetween. In the same drawing, a region sandwiched between adjacent chain double-dashed lines is a region used for production of one drip bag.

Figure 19:
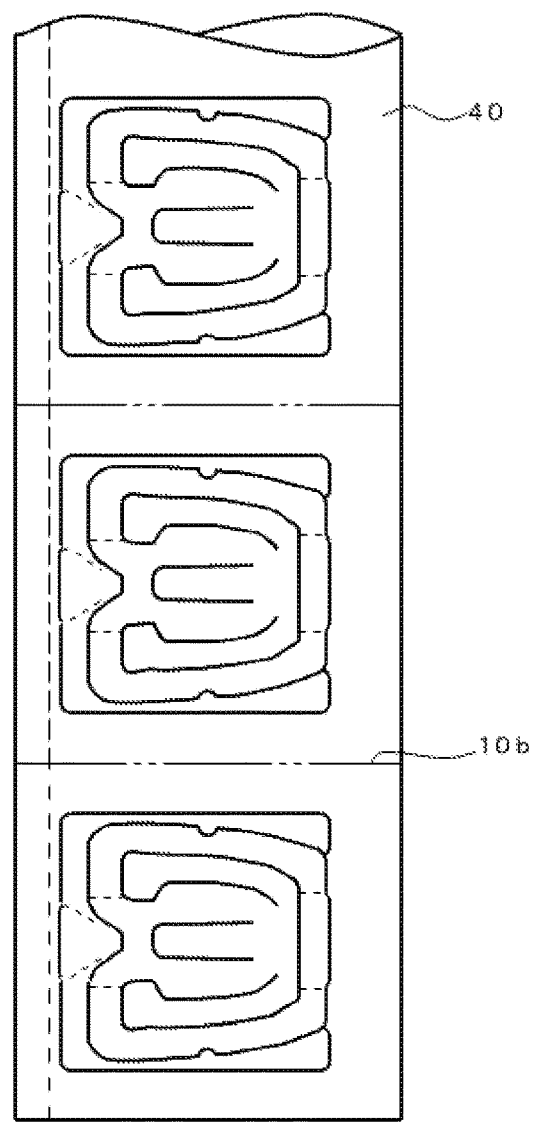
FIG. 19 is an explanatory view of a producing method of drip bags.
Figure 19:
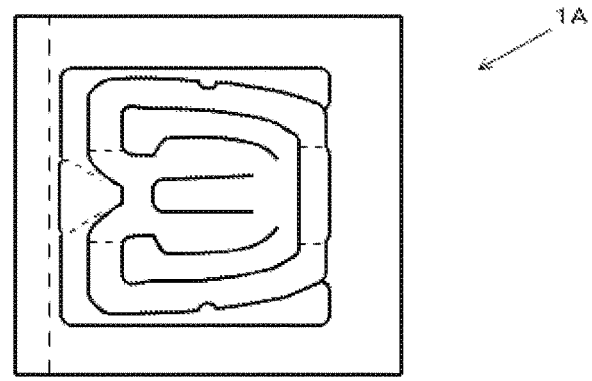
Figure 20A:
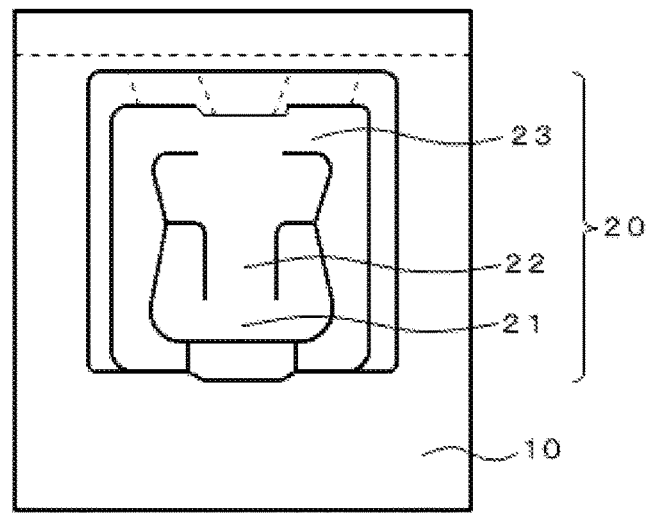
FIG. 20A is a plan view of a conventional drip bag 1x.
Figure 20B:
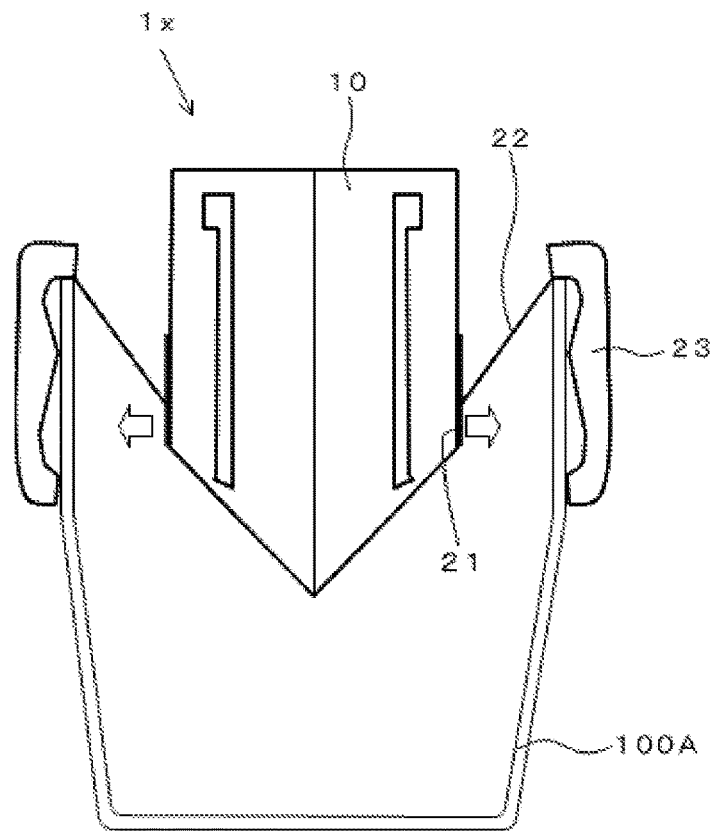
FIG. 20B is a side view of the conventional drip bag 1x being hooked onto a cup with a large opening diameter.
Figure 20C:
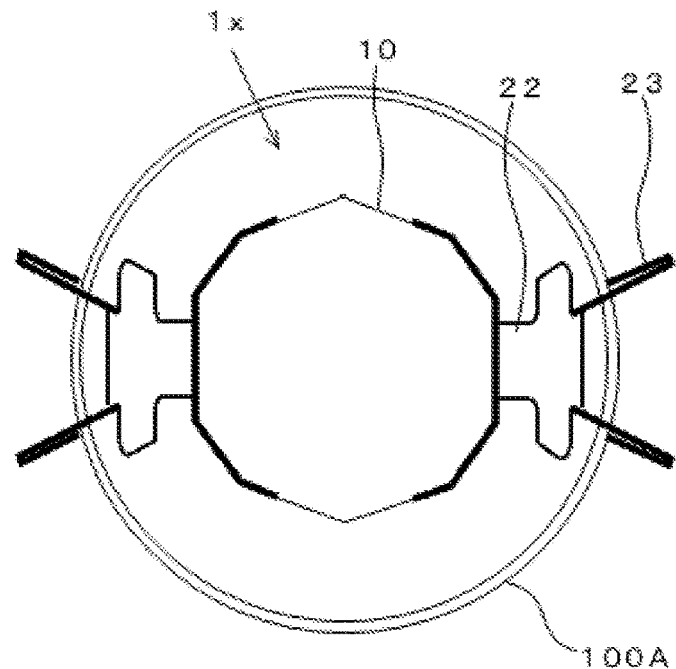
FIG. 20C is a top view of the conventional drip bag 1x being hooked onto the cup with the large opening diameter.

Next, as illustrated in FIG. 19, the drip bag production sheet 40 is folded in two so that longer sides of the sheet 40 overlap each other, and the sides are welded together (longitudinal sealing) to form a cylindrical body. Welding of the cylindrical body in a short-side direction (transverse seal) and filling of an extraction material are repeatedly performed alternately to produce a continuous drip bag body in which the sides 10b of the bag main bodies of the drip bags 1A are connected to each other. The continuous drip bag body is then separated to obtain individual drip bags 1A. Alternatively, the sides are welded and cut at the same time, so that the individually separated drip bags 1A are continuously produced.

REFERENCE SIGNS LIST 1x, 1A, 1B, 1C, 1D, 1E, 1F, 1G, 1H, 1I, 1J, 1K, 1L drip bag
10 bag main body
10a upper side of bag main body
10b side of bag main body
10c bottom side of bag main body
11 opening portion
12 opening guide line
20 hooking member
21 central portion
22 arm portion
22a fixed edge
22b side closer to center line
22c side closer to side of bag main body
23 hooking portion
23a portion of hooking portion
24 upper bonded portion
25 protruding portion
25a edge side of protruding portion
26 reinforcing portion
27 central bonded portion
28 upper connecting portion
29 lower connecting portion
30 second central bonded portion
40 drip bag production sheet
41 water permeable filter sheet
100 cup
100A cup with large opening diameter
100B cup with small opening diameter
A center line of width of bag main body
L1 oblique folding line
L2 vertical folding line
L3 vertical folding line
L4 vertical folding line
α inclination angle

The invention claimed is:

1. A drip bag comprising:
a bag main body formed of a water permeable filter sheet; and
hooking members made of a thin plate-like material provided on two opposite outer surfaces of the bag main body, wherein
each of the hooking members provided on the two surfaces includes:
an upper bonded portion provided along an upper side of the bag main body;
a central portion provided in a center of each of the hooking members, the central portion being unable to be pulled up from the bag main body;
a pair of arm portions provided from the central portion to a direction toward the upper bonded portion, the pair of arm portions being spaced apart from each other with a center line of a width of the bag main body located between them; and
a pair of hooking portions, each hooking portion among the pair of hooking portions being continuous with an upper part of a respective arm portion among the pair of arm portions, each hooking portion extending downward from the upper part of the respective arm portion, the pair of hooking portions being not bonded onto the bag main body, wherein:
each arm portion among the pair the arm portions is capable of being pulled up from the bag main body at an upper part thereof, each arm portion among the pair of arm portions has a fixed edge fixed onto the bag main body at a lower part thereof, the fixed edge is adjoined to the upper part that is capable of being pulled up from the bag main body, and the fixed edge is inclined with respect to a width direction of the bag main body or extends downward vertically with respect to the width direction of the bag main body from a lower end of a side, farther from the center line, out of left and right sides of the respective arm portion among the pair of arm portions; and
the fixed edge is defined between:
a bottom end of the left side of the respective arm portion among the pair of arm portions and
a bottom end of the right side of the respective arm portion among the pair of arm portions.

2. The drip bag according to claim 1, wherein the upper bonded portion includes a protruding portion in which a center portion thereof in the width direction of the bag main body protrudes downward, and a pair of oblique folding lines provided with the center line located between them, with the oblique folding lines extending in a direction away from the center line from a lower part of the protruding portion to an upper side of the upper bonded portion, without touching an edge side of the protruding portion.

3. The drip bag according to claim 1, further comprising an upper connecting portion that connects the pair of arm portions to each other at the upper parts of the arm portions.

4. The drip bag according to claim 1, further comprising a lower connecting portion that connects the pair of hooking portions to each other at lower parts of the hooking portions.

5. The drip bag according to claim 1, wherein sides of each arm portion among the pair arm portions are curved into an arc shape at an adjoining portion to the fixed edge.

6. The drip bag according to claim 1, wherein the bag main body is filled with an extraction material, and the bag main body is closed at a top end portion of the bag main body.

7. The drip bag according to claim 1, wherein a bonded region at which the hooking members are bonded to the bag main body extends below the fixed edge, outward from the center line farther than the fixed edge.

* * * * *